Aug. 4, 1936.  J. C. SUTTON  2,049,632
BATHROOM SCALE
Filed May 31, 1935  2 Sheets-Sheet 1
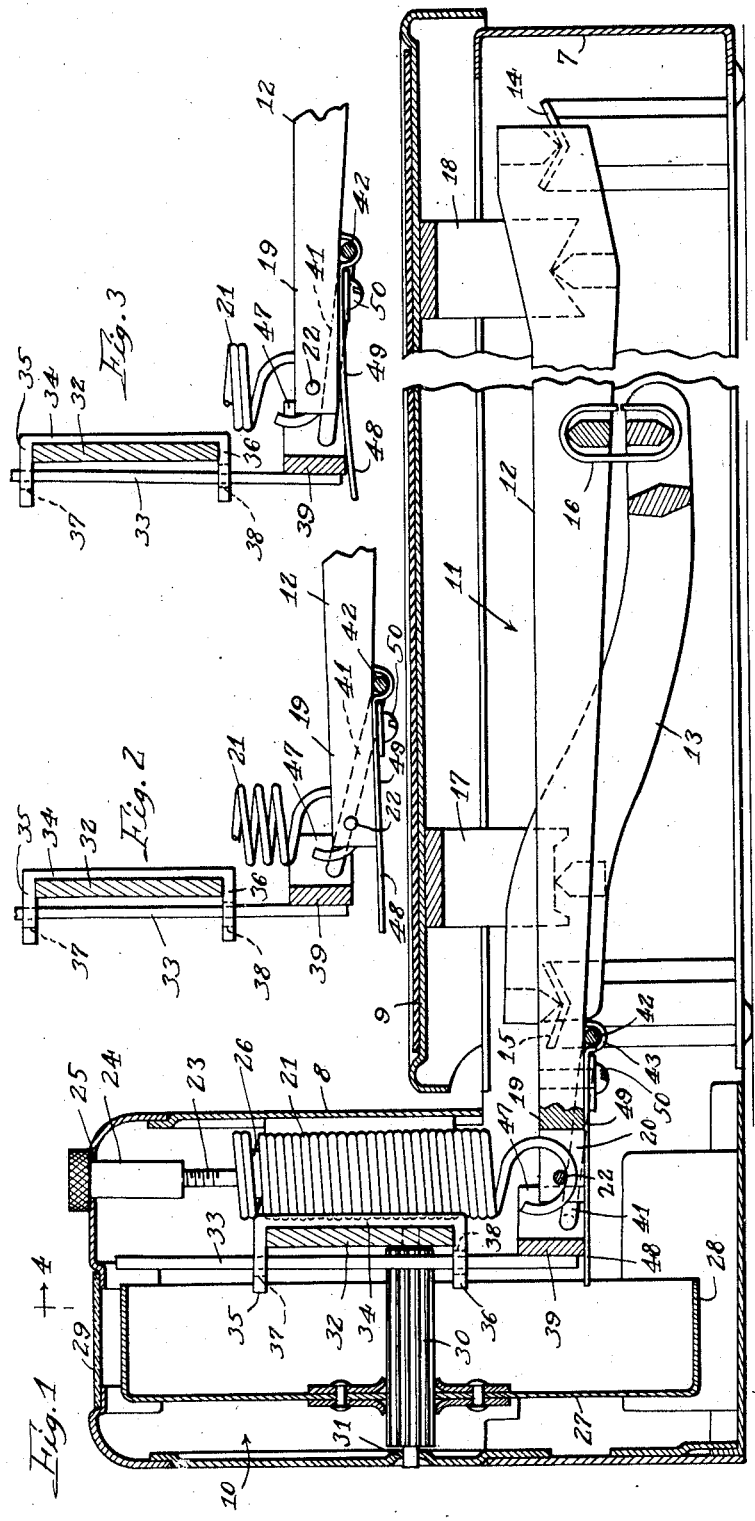

Aug. 4, 1936.  J. C. SUTTON  2,049,632
BATHROOM SCALE
Filed May 31, 1935   2 Sheets-Sheet 2
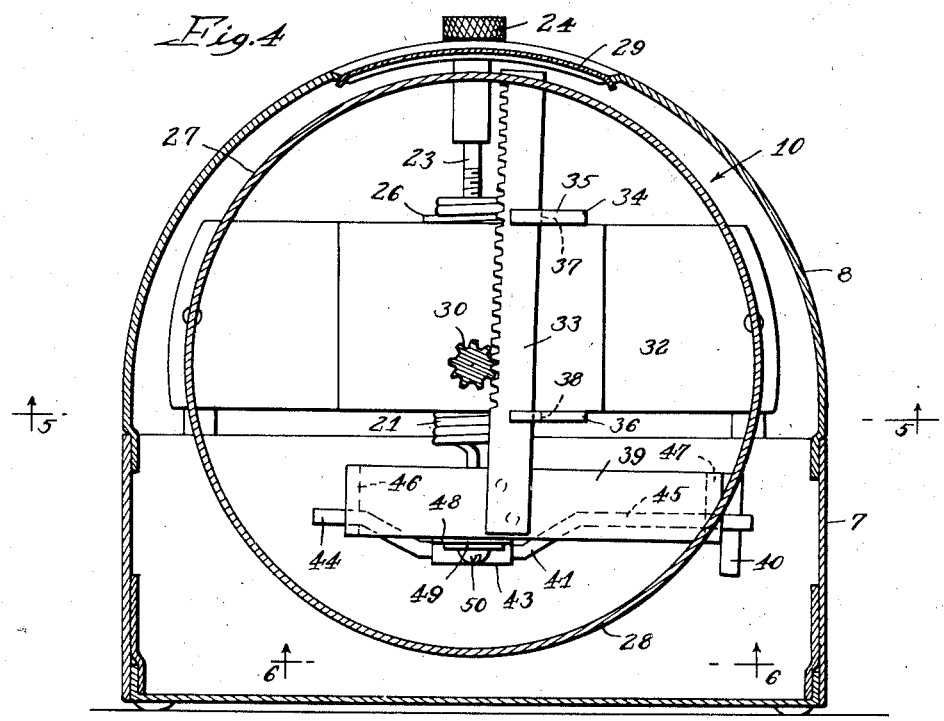
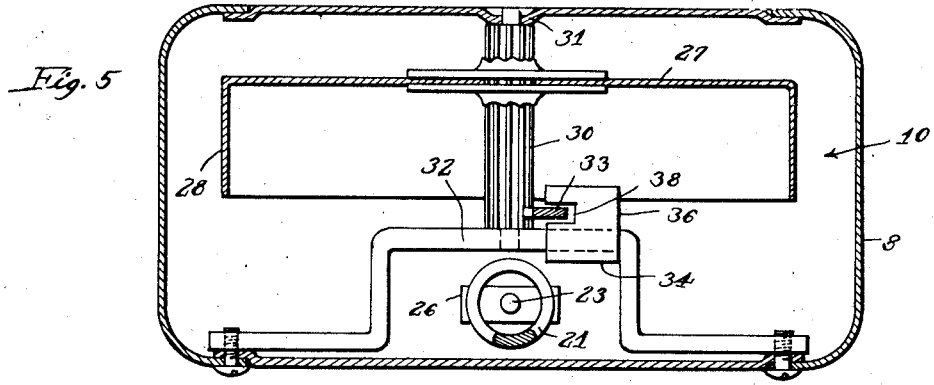
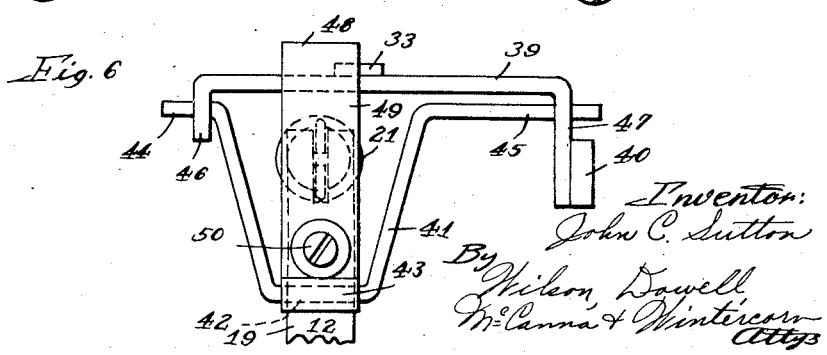

Patented Aug. 4, 1936

2,049,632

UNITED STATES PATENT OFFICE 2,049,632

BATHROOM SCALE

John C. Sutton, Rockford, Ill., assignor to The Brearley Company, Rockford, Ill., a corporation of Illinois Application May 31, 1935, Serial No. 24,203

12 Claims. (Cl. 265—68)

This invention relates to scales generally, and more particularly to that type known as bathroom scales.

One of the chief problems in the manufacture of bathroom scales has been to relieve the indicating mechanism of excessive stresses and strains that are otherwise transmitted thereto through the lever mechanism from the platform when a person steps onto or off the scale, and particularly when a person purposely jars the scale while standing on the platform, either by teetering back and forth on the toes and heels or jumping up and down. The delicate indicating mechanism when connected directly and positively to the lever mechanism was quite apt to be damaged in such operation and the only solution offered thus far has been to provide a lost motion connection between the two mechanisms, which, however, has not been satisfactory inasmuch as it relieved the condition only in one direction, namely, while the lever moved away from the indicating mechanism. On the recoil movement, the loosely connected parts of the two mechanisms would have momentum in opposite directions, and the shock transmitted to the indicating mechanism was accordingly so much worse. It is therefore the principal object of my invention to provide a scale in which the rack meshing with the pinion of the indicating mechanism is in substantially full floating relation to the lever mechanism, whereby to relieve the indicating mechanism of shocks and jars regardless of rough usage of the scale.

In accordance with the present invention, the rack is arranged to gravitate from an initial position to a new position when the lever of the lever mechanism associated therewith is deflected downwardly against spring action under the weight of a person standing on the scale platform, whereby to lightly turn the dial from a zero position to one indicating the person's weight. Any inertia or tendency for the parts of the indicating mechanism to stick is overcome by a bail connection between the lever and a crosshead on the lower end of the rack, the bight portion of the bail being pivotally secured to the lever, and the two forwardly extending arms of the bail being pivotally connected to the ends of the crosshead. In this way the indicating mechanism is allowed to lag behind the lever mechanism only to a predetermined extent, and the rack is maintained at all times in a plane substantially at right angles to the lever and pinion with minimum friction involved in the guiding thereof.

In accordance with another feature of my invention, I provide a leaf spring projecting from the aforesaid lever upon which the aforesaid crosshead will come to rest in the operation of the scale, whereby to afford a cushioning action to relieve the indicating mechanism of what little shock would result if the crosshead bottomed on an unyielding projection on the lever.

The invention is illustrated in the accompanying drawings, in which—

Figure 1 is a longitudinal section through a scale made in accordance with my invention;

Figs. 2 and 3 are fragmentary details showing the bail connection between the lever and crosshead, and also illustrating the cushioning action of the leaf spring;

Fig. 4 is a cross-section on the line 4—4 of Fig. 1 looking rearwardly at the rack and its crosshead and the bail therefor;

Fig. 5 is a horizontal section on the line 5—5 of Fig. 4 looking in the direction of the arrows, and Fig. 6 is a bottom view of the bail connection as seen looking in the direction of the arrows at 6—6 in Fig. 4.

The same reference numerals are applied to corresponding parts throughout the views.

The scale, as appears in Fig. 1, comprises a base 7 of sheet metal construction generally rectangular in form and having a substantially semi-cylindrical housing 8 projecting upwardly from the front end thereof in transverse relation to the platform 9. In the housing 8 is the indicating mechanism 10 arranged to be operated by the lever mechanism 11 disposed in the base 7. The lever mechanism comprises two wishbone levers 12 and 13 having their arms fulcrumed at 14 and 15 on the opposite sides of the base 7, in a well known manner. A centrally disposed link 16 interconnects the two levers in the usual way, so as to apply the weight imposed upon the lever 13 at the front end of the platform, as at 17, to the lever 12 along with the weight imposed directly upon the lever 12 at the rear end of the platform, as at 18. The forwardly reaching arm 19 of the lever 12 is slotted, as at 20, to receive the lower end of a coiled spring 21 connected to the lever 12 by a cross-pin 22. The spring is suspended on a screw 23 threaded in an adjusting nut 24 swiveled in an opening 25 in the top wall of the housing 8. A crosspiece 26 affixed to the lower end of the screw 23 is threaded into the upper end of the spring at the factory in the calibration checkup, and thereafter remains in its adjusted position. The nut 24 is adjusted by the operator only in resetting the scale to zero.

The indicating mechanism 10 comprises a rotary dial 27 formed from sheet metal to a hollow cylindrical shape so as to provide an annular flange 28 on the outer periphery of which the graduated weight scale will be painted or affixed and visible through a window 29 provided in the top wall of the housing 8. The window will have a hair-line or other reference marking thereon to be used as an index in reading the weight appearing on the dial. The dial is suitably fixed upon an elongated pinion 30 axially disposed with respect to the dial and having reduced smooth journal portions formed on the opposite ends thereof, the front journal being received in a bearing 31 provided therefor in the front wall of the housing 8, and the rear journal being received in a bearing provided therefor in a bracket 32 secured to the rear wall of the housing 8, as best appears in Fig. 5. A rack 33 meshes with the pinion 30 in front of the bracket 32, but behind the dial 27. A vertical strap 34 welded or otherwise suitably secured to the back of the bracket 32 has forwardly bent ends 35 and 36 which are notched, as indicated at 37 and 38, to provide upper and lower guides for the rack 33. The rack is quite loosely received in these guides and has a U-shaped crosshead 39 welded or otherwise suitably secured to the lower end thereof carrying a counter-weight 40 on one end thereof which causes the rack to always assume a position like that clearly illustrated in Fig. 4, which shows the rack as bearing near its upper end in the guide 37 and having close meshing engagement intermediate its ends with the pinion 30. The rack, in other words, is kept under light constraint toward close meshing engagement with the pinion so as to eliminate play at this point and accordingly make for greater accuracy in the weight indication given by the dial 27 that is affixed to the pinion 30. The weighted crosshead 39 also causes the rack 33 to gravitate when the lever mechanism is deflected under the weight of a person standing upon the scale platform, whereby to turn the dial 28 and indicate the person's weight. I shall now describe an important feature of my invention having to do with the novel connection between the rack 33 of the indicating mechanism 10 and the lever 12 of the lever mechanism 11.

The rack 33 of the indicating mechanism is in substantially full floating relation to the lever mechanism. The only connection between the indicating mechanism and the lever mechanism is that provided by a bail 41 formed from a piece of wire bent to the shape best appearing in Fig. 6 whereby to provide a straight transverse bight portion 42 received in a transverse bearing 43 on the bottom of the forwardly reaching arm 19 of the lever 12, and two trunnion ends 44 and 45 on the forwardly reaching arms of the bail pivotally received in aligned holes in the rearwardly bent ends 46 and 47 of the crosshead 39. The crosshead 39 normally rests upon a projection 48 on the front end of the arm 19, as appears in Fig. 1, but, when someone steps onto the scale platform, the lever 12 is immediately deflected downwardly and, due to the inertia of the rack 33 and the rest of the indicating mechanism 10, the projection 48 will at first assume a spaced relationship to the crosshead 39, as in Fig. 2. However, the rack 33 and the crosshead 39 gravitate toward the projection 48 under their own weight, and the rack 33 in so doing turns the dial 27 through the pinion 30. In the event the rack tends to catch, due to some peculiarity in the meshing engagement of its teeth with the pinion 30 or due to close fitting of the journal ends of the pinion in their bearings, or through any other cause, the bail 41 will start the rack in its downward movement. The starting may be due only to the slight pull to the rear transmitted to the crosshead 39 by the bail 41 when the lever 12 first moves downwardly away from the crosshead, and, if that is not sufficient to start the rack gravitating downwardly, the bail 41 will upon further downward movement of the lever 12 communicate a definite downward pull on the crosshead when the lever 12 is deflected far enough downwardly away from the crosshead, as should be evident. The bail, of course, keeps the crosshead 39 in a plane substantially at right angles to the arm 19 of the lever 12, and accordingly maintains the rack 33 at all times in the proper relation to the pinion 30. Now, when the rack 33 gravitates downwardly and finally bottoms on the projection 48 at whatever position the lever 12 has finally assumed in the elongation of the spring 21, according to the weight of the person standing on the scale platform, the dial 27 will, of course, have been turned by the rack proportionately and indicates the person's weight. The dial obviously will not be operated simultaneously the moment weight is imposed upon the scale platform but there will be a definite lag; the lever 12 will move down to a certain position according to the weight imposed, and the dial will follow and turn through a proportionate angularity. This gives a more pleasing effect than where the dial is directly connected with the lever mechanism of the scale and can be jarred back and forth to the accompaniment of a disagreeable rattle and clatter of interconnected metallic parts by the person teetering back and forth on the toes and heels or jumping up and down. With the present construction, since the indicating mechanism is in floating relation to the lever mechanism, it will not respond to these sudden movements of the lever mechanism but behaves similarly as any indicating mechanism having a dashpot action to secure smoother movement of the needle or dial, as the case may be.

The projection 48 is provided by a leaf spring 49 fastened by a screw and lock washer 50 to the bottom of the arm 19, the rear end of this spring being formed into a semi-circular loop to provide the bearing 43 previously mentioned. This spring is light enough so that the momentum of the gravitating rack 33 and crosshead 39 will result in a slight deflection of the spring, illustrated in Fig. 3, to an exaggerated degree. Obviously, the deflection of the spring 49 gives a cushioning action so that the rack 33 will come to rest more quickly than it would if the projection 48 were an unyielding one. Furthermore, this cushioning action relieves the indicating mechanism of what slight shock and jar would otherwise be transmitted thereto if the crosshead 39 bottomed on an unyielding projection. The cushioning action also relieves the indicating mechanism of most of the shock that would otherwise be transmitted when the scale is used roughly, as by teetering or jumping thereon. The bail 41 also comes into play under the conditions just mentioned to discourage too free movement of the rack 33 by restraint upon the crosshead 39; one cannot, for instance, cause any extreme recoil movement of the rack 33 by properly timed impulses transmitted to the platform 9, because the bail 41 promptly checks the upward movement of the rack 33.

It is believed the foregoing description conveys a good understanding of all of the objects and advantages of my invention. The appended claims have been drawn with a view to covering all legitimate modifications and adaptations.

I claim:

1. In a weighing scale, the combination of a base, a platform movably supported relative thereto on lever mechanism fulcrumed in said base, spring means resisting the movement of the lever mechanism, a weight-indicating dial rotatably mounted on said base on a substantially horizontal axis, a pinion for turning the same, a gravitating rack meshing with the pinion and movable substantially vertically, the lever mechanism including a movable portion upon which the rack is arranged to come to rest, and a substantially horizontally disposed link pivotally connected at one end to the rack and at the other end to the aforesaid movable portion of the lever mechanism, and providing an operating connection between the rack and lever mechanism while leaving the rack in substantially full floating relation to the lever mechanism.

2. A scale as set forth in claim 1, wherein the link comprises a substantially U-shaped bail member pivotally connected at the bight portion to the movable portion of the lever mechanism and having the free ends of the arms of the bail pivotally connected at laterally spaced points to the rack, whereby to hold the rack in a certain plane relative to the pinion associated therewith.

3. A scale as set forth in claim 1, including a yieldable support for the rack on the movable portion of the lever mechanism, whereby to cushion the inter-engagement of the parts, substantially as described.

4. In a weighing scale, the combination of a base, a platform movably supported relative thereto on lever mechanism fulcrumed in said base, spring means resisting the movement of the lever mechanism, a weight-indicating dial arranged to turn on a substantially horizontal axis relative to the base, a pinion fixed to and arranged to turn the dial and supported in spaced bearings on the base, a rack substantially vertically disposed adjacent one of the bearings and meshing with the rack, a guide for the rack above one of the bearings and the pinion, said rack having a counter-weight on the lower end thereof on that side remote from the pinion, whereby to keep the rack in close meshing engagement with the pinion, substantially as described, said rack resting normally in engagement with a movable portion of the lever mechanism, the rack by reason of its counter-weight being also arranged to move downwardly by gravity to follow the movement of the lever mechanism and accordingly actuate the dial, and a link member extending substantially horizontally and pivoted at one end to the movable portion of the lever mechanism and at the other end to the lower end of the rack, whereby to provide an operating connection while leaving the rack in substantially full floating relation to the lever mechanism.

5. In a weighing scale, the combination of a base, a platform movably supported relative thereto on lever mechanism fulcrumed in said base, spring means resisting the movement of the lever mechanism, a weight-indicating dial arranged to turn on a substantially horizontal axis relative to the base, a pinion fixed to and arranged to turn the dial and supported in spaced bearings on the base, a rack substantially vertically disposed adjacent one of the bearings and meshing with the rack, a guide for the rack above one of the bearings and the pinion, said rack having a counter-weight on the lower end thereof on that side remote from the pinion, whereby to keep the rack in close meshing engagement with the pinion, substantially as described, said rack resting normally in engagement with a movable portion of the lever mechanism, the rack by reason of its counter-weight being also arranged to move downwardly by gravity to follow the movement of the lever mechanism and accordingly actuate the dial, and a bail member substantially horizontally disposed and having the bight portion thereof pivoted to the movable portion of the lever mechanism and the ends of the arms of the bail pivoted to the lower end of the rack, whereby to provide an operating connection between the lever mechanism and the rack leaving the rack in substantially full floating relation to the lever mechanism, and also maintain the rack in a certain plane in relation to the pinion associated therewith.

6. In a weighing scale, a base, a pair of interconnected wishbone levers fulcrumed on the base and supporting a platform, one of said levers having a forwardly reaching arm extending into a dial housing on the front end of the base, a spring in the dial housing attached to said arm and serving to resist downward movement of the levers and arm, a dial rotatably mounted in the housing having a pinion for rotating the same, a rack substantially vertically disposed in the housing in meshing engagement with the pinion and arranged to gravitate downwardly and thereby turn the dial, a support on the aforesaid arm arranged to be engaged by the lower end of said rack to limit downward movement thereof, the support comprising a leaf spring element arranged to be deflected downwardly relative to the arm associated therewith upon interengagement with the rack with sufficient force, substantially as described, and a link disposed in transverse relation to the rack and pivotally connected at one end to the rack and at the other end to the forwardly reaching arm of the platform supporting lever and providing an operating connection between the rack and lever.

7. In a weighing scale, a base, a pair of interconnected wishbone levers fulcrumed on the base and supporting a platform, one of said levers having a forwardly reaching arm extending into a dial housing on the front end of the base, a spring in the dial housing attached to said arm and serving to resist downward movement of the levers and arm, a dial rotatably mounted in the housing having a pinion for rotating the same, a rack substantially vertically disposed in the housing in meshing engagement with the pinion and arranged to gravitate downwardly and thereby turn the dial, a support on the aforesaid arm arranged to be engaged by the lower end of said rack to limit downward movement thereof, the support comprising a leaf spring element arranged to be deflected downwardly relative to the arm associated therewith upon interengagement with the rack with sufficient force, substantially as described, and a bail member substantially horizontally disposed having a transverse bight portion pivotally received and retained in a substantially semi-circular bent fixed end of the leaf spring and having the ends of the two arms thereof pivotally connected to the lower end of the rack.

8. In a weighing scale, a base, a pair of interconnected wishbone levers fulcrumed on the base and supporting a platform, one of said levers having a forwardly reaching arm extending into a dial housing on the front end of the base, a spring in the dial housing attached to said arm and serving to resist downward movement of the levers and arm, a dial rotatably mounted in the housing having a pinion for rotating the same, a rack substantially vertically disposed in the housing in meshing engagement with the pinion and arranged to gravitate downwardly and thereby turn the dial, a support on the aforesaid arm arranged to be engaged by the lower end of said rack to limit downward movement thereof, a crosshead on the lower end of the rack in substantially right angle relation to the end of said arm, and a U-shaped bail member having the bight portion thereof transversely disposed relative to the arm and pivoted thereon, the two arms of the bail member extending forwardly and having their ends pivoted on the ends of the crosshead.

9. In a weighing scale, a base, a pair of interconnected wishbone levers fulcrumed on the base and supporting a platform, one of said levers having a forwardly reaching arm extending into a dial housing on the front end of the base, a spring in the dial housing attached to said arm and serving to resist downward movement of the levers and arm, a dial rotatably mounted in the housing having a pinion for rotating the same, a rack substantially vertically disposed in the housing in meshing engagement with the pinion and arranged to gravitate downwardly and thereby turn the dial, a support on the aforesaid arm arranged to be engaged by the lower end of said rack to limit downward movement thereof, and a link member pivoted at its rear end on the aforesaid arm and extending forwardly from said arm and pivotally connected to the rack.

10. In a scale, a member movable downwardly when weight is imposed on the scale, a vertically movable gravity actuated rack resting on said member under no-load conditions, the rack and member being arranged to separate freely when load is imposed on the scale, and a link disposed in transverse relation to the rack and pivotally connected at one end to the rack and at the other end to the aforesaid member and providing an operating connection between the rack and member.

11. A scale as set forth in claim 10, wherein the link comprises a substantially U-shaped bail member pivotally connected at the bight portion thereof to the movable member and having the free ends of the arms of the bail pivotally connected at laterally spaced points to the rack, whereby to hold the rack against displacement from a certain plane.

12. A scale as set forth in claim 10, including a yieldable support for the rack on the movable member, whereby to cushion the interengagement of the parts.

JOHN C. SUTTON.